US007801351B2

United States Patent
Srinivas et al.

(10) Patent No.: US 7,801,351 B2
(45) Date of Patent: Sep. 21, 2010

(54) METHOD AND SYSTEM TO MANAGE DIGITAL MEDICAL IMAGES

(75) Inventors: Yogesh Srinivas, Hartland, WI (US); Kadri Nizar Jabri, Waukesha, WI (US); Rathinasabapathy Ramalingam, Bangalore (IN); Tabb Alan Patz, New Berlin, WI (US); Nicholas Louis Marinelli, Wauwatosa, WI (US)

(73) Assignee: General Electric Company, Schenectady, NY (US)

( * ) Notice: Subject to any disclaimer, the term of this patent is extended or adjusted under 35 U.S.C. 154(b) by 1061 days.

(21) Appl. No.: 11/407,623

(22) Filed: Apr. 20, 2006

(65) Prior Publication Data

US 2007/0165141 A1 Jul. 19, 2007

Related U.S. Application Data

(60) Provisional application No. 60/739,283, filed on Nov. 22, 2005.

(51) Int. Cl.
*G06K 9/00* (2006.01)
*G06K 9/36* (2006.01)
*G09G 5/00* (2006.01)

(52) U.S. Cl. .................. 382/132; 382/128; 382/284; 345/629

(58) Field of Classification Search .......... 382/128, 382/132, 284; 345/629
See application file for complete search history.

(56) References Cited

U.S. PATENT DOCUMENTS 5,833,607 A    11/1998  Chou et al.
5,986,279 A *  11/1999  Dewaele ............... 250/582
6,075,905 A *   6/2000  Herman et al. ........ 382/284
6,392,658 B1*   5/2002  Oura .................... 345/629
6,459,094 B1*  10/2002  Wang et al. ........... 250/584
6,563,943 B1*   5/2003  Sasada ................. 382/132
6,600,831 B1*   7/2003  Sasada ................. 382/132
6,714,680 B1*   3/2004  Sasada ................. 382/216
6,793,390 B2*   9/2004  Wang et al. ........... 378/174
6,895,106 B2*   5/2005  Wang et al. ........... 382/132
6,944,265 B2    9/2005  Warp ................. 378/98.12
7,010,152 B2*   3/2006  Bojer et al. ........... 382/132

(Continued)

FOREIGN PATENT DOCUMENTS

EP       1231484 A2      8/2002

OTHER PUBLICATIONS

France Search Report for Application No. 0655047—filed Nov. 22, 2006.

(Continued)

*Primary Examiner*—Vikkram Bali
*Assistant Examiner*—Katrina Fujita
(74) *Attorney, Agent, or Firm*—Cantor Colburn LLP

(57) ABSTRACT

An interactive user interface (UI) for managing digital medical images is disclosed. The UI includes a first display panel for displaying more than one of the digital medical images and a point on each digital medical image located in associated regions for stitching pairs of the digital medical images together, and a second display panel for displaying a composite image comprising the stitched digital medical images. The UI provides means for a user to modify the location of the points and means for applying an algorithm to regenerate the composite image in response to the location of the points.

22 Claims, 4 Drawing Sheets

U.S. PATENT DOCUMENTS

| | | | |
|---|---|---|---|
| 7,127,090 B2 * | 10/2006 | Kreang-Arekul et al. | 382/128 |
| 7,412,111 B2 * | 8/2008 | Battle et al. | 382/284 |
| 7,558,438 B1 * | 7/2009 | Sasada | 382/284 |
| 7,630,579 B2 * | 12/2009 | Mai et al. | 382/284 |
| 2002/0044676 A1 | 4/2002 | Wei et al. | |
| 2002/0081010 A1 * | 6/2002 | Chang et al. | 382/132 |
| 2003/0069897 A1 * | 4/2003 | Roy et al. | 707/104.1 |
| 2005/0041041 A1 * | 2/2005 | Sakai | 345/629 |
| 2005/0046642 A1 * | 3/2005 | Takekoshi | 345/619 |

OTHER PUBLICATIONS

Written Opinion for Application No. 0655047—filed Nov. 22, 2006.

* cited by examiner

METHOD AND SYSTEM TO MANAGE DIGITAL MEDICAL IMAGES

CROSS REFERENCE TO RELATED APPLICATIONS

This application claims the benefit of U.S. provisional application No. 60/739,283, filed Nov. 22, 2005, the contents of which are incorporated by reference herein in their entirety.

BACKGROUND OF THE INVENTION

The present disclosure relates generally to digital medical images and particularly to the management of digital medical images.

In digital radiography, the maximum size of an image from a single radiographic exposure is determined primarily by the size of the detector. Typical sizes are 41×41 centimeters (cm) for a flat panel detector or 14×17 inches (36×43 cm) for a Computed Radiography (CR) plate. Large anatomies such as the whole spine, legs, and the chest/lung region of a large patient for example, may not be imaged within a single detector area.

Various methods to accommodate such imaging requirements for large anatomies have been developed. Individual exposures of smaller regions within a large anatomy may be taken with some overlap and viewed separately, such as two images to view the left and the right side of the chest, or individual images of sections of the spine, for example. Individual exposures may be taken with some overlap, and subsequently manually aligned as digital images to create a composite image comprising each of the individual exposures. Multiple digital images may also be automatically aligned to create a composite image.

Viewing individual images does not provide a composite image of the anatomy. There may also be variability in image quality and/or magnification between the individual images depending on anatomy and radiographic technique, which may be distracting, therefore reducing the diagnostic quality of the image. The process of manually aligning the images may be cumbersome and require multiple iterations. Automatic creation of composite images and composite image processing may provide significant savings in operator time and consistent image quality along the extant of the composite image. However, due to patient motion during acquisition, imperfect positioning, and software and hardware failures, an inaccurate or misaligned composite image may be created. Inaccurate alignment may affect the quality of the composite image processing. Due to system or user errors, the system may be unable to automatically create a composite image following acquisition of the individual images in a sequence.

Accordingly, there is a need in the art for an improved image management arrangement that overcomes these drawbacks.

BRIEF DESCRIPTION OF THE INVENTION

An embodiment of the invention includes an interactive user interface (UI) for managing digital medical images. The UI includes a first display panel for displaying more than one of the digital medical images and a point on each digital medical image located in associated regions for stitching pairs of the digital medical images together, and a second display panel for displaying a composite image comprising the stitched digital medical images. The UI provides means for a user to modify the location of the points and means for applying an algorithm to regenerate the composite image in response to the location of the points.

Another embodiment of the invention includes a method for managing digital medical images. The method includes selecting one of the digital medical images or a composite medical image comprising the digital medical images, and selecting a stitching region of the composite medical image to display more than one of the digital medical images in a first display panel and to display the composite image in a second display panel. The method allows modification of display size, location, and intensity of the digital medical images in the first display panel and the composite image in the second display panel, locating a point within each stitching region associated with a pair of the digital medical images, the stitching region of each image having common image attributes, and regenerating the composite image based on the location of the corresponding points.

Another embodiment of the invention includes a computer program product comprising a computer readable medium having computer readable program code configured for implementing the method of managing digital medical images.

Another embodiment of the invention includes a computer system for managing a plurality of radiographic images, the system including a display, an input device, a processing circuit; and a storage device, readable by the processing circuit, storing instructions for execution by the processing circuit for implementing the method of managing digital medical images.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an interactive and efficient method to correct misalignments following the automatic creation of a composite image or to create a composite image when it is not available for a sequence of digital medical images. A User Interface (UI) provides simultaneous display of two or more individual images obtained as part of an image sequence, as well as a stitched composite image representing all images of the image sequence aligned with respect to each other, and a means to mark corresponding points, or "landmarks" on the individual images. An embodiment of the invention also provides a means to vary the display size and position, and pixel intensity of the individual images and the composite image. Realignment of the individual images within the composite image is accomplished via the points on each adjoining image. Following realignment, the composite image display may be immediately regenerated.

This UI provides the user the capability to interactively and efficiently correct any misalignments following the automatic creation of a composite image, manually align individual images of a sequence for which automatic generation of a composite image is not available, or manually align individual images of a sequence for which automatic generation of a composite image did not occur due to a malfunction or processing disturbance in the system.

Figure 1:
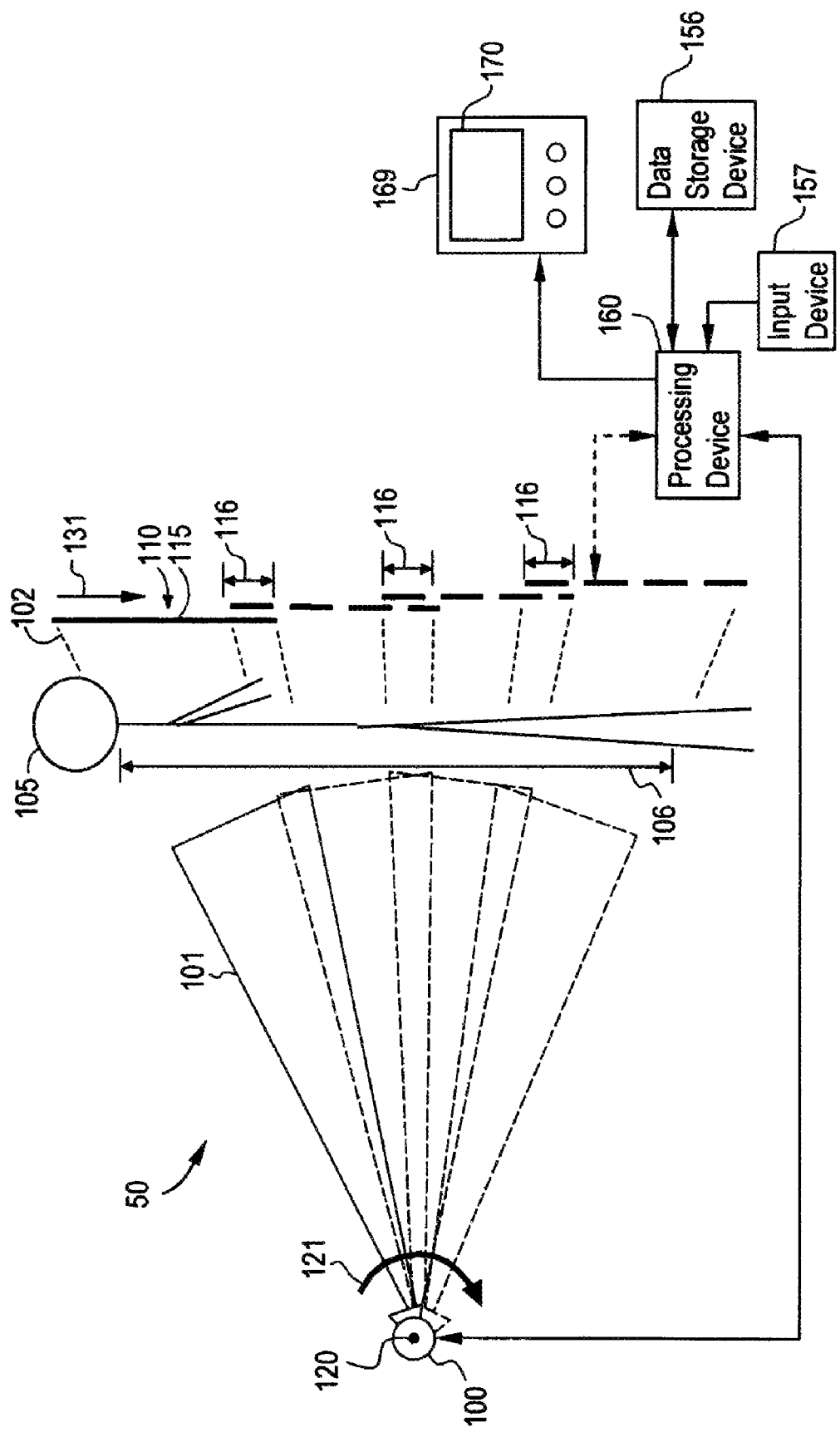
FIG. 1 depicts an exemplary block schematic radiographic system in accordance with embodiments of the invention.

Referring to FIG. 1, a schematic of an exemplary embodiment of a radiography system 50 is depicted. An x-ray source (also herein referred to as an imaging source) 100 projects an x-ray beam (also herein referred to as imaging radiation) 101, which is directed through an imaging object 105 such as a portion of human anatomy for example, toward a panel detector (also herein referred to as an image detector) 110. As depicted in FIG. 1, imaging object 105 is representative of a human body in stick figure form. Because a region of interest 106 of the imaging object 105 may be larger than the panel detector 110, multiple exposures may need to be taken.

In the embodiment, the x-ray source 100 is capable to rotate through a center point 120 creating an arc of rotation 121. Similarly, the panel detector 110 is capable to translate in a linear direction as indicated by direction line 131. As the x-ray beam 101 passes through the imaging object 105, components of varying densities within the imaging object 105 provide for differential x-ray attenuation. An attenuated x-ray Beam 102 is received by the panel detector 110, which produces an electrical signal responsive to the intensity of the attenuated x-ray beam 102.

Figure 2:
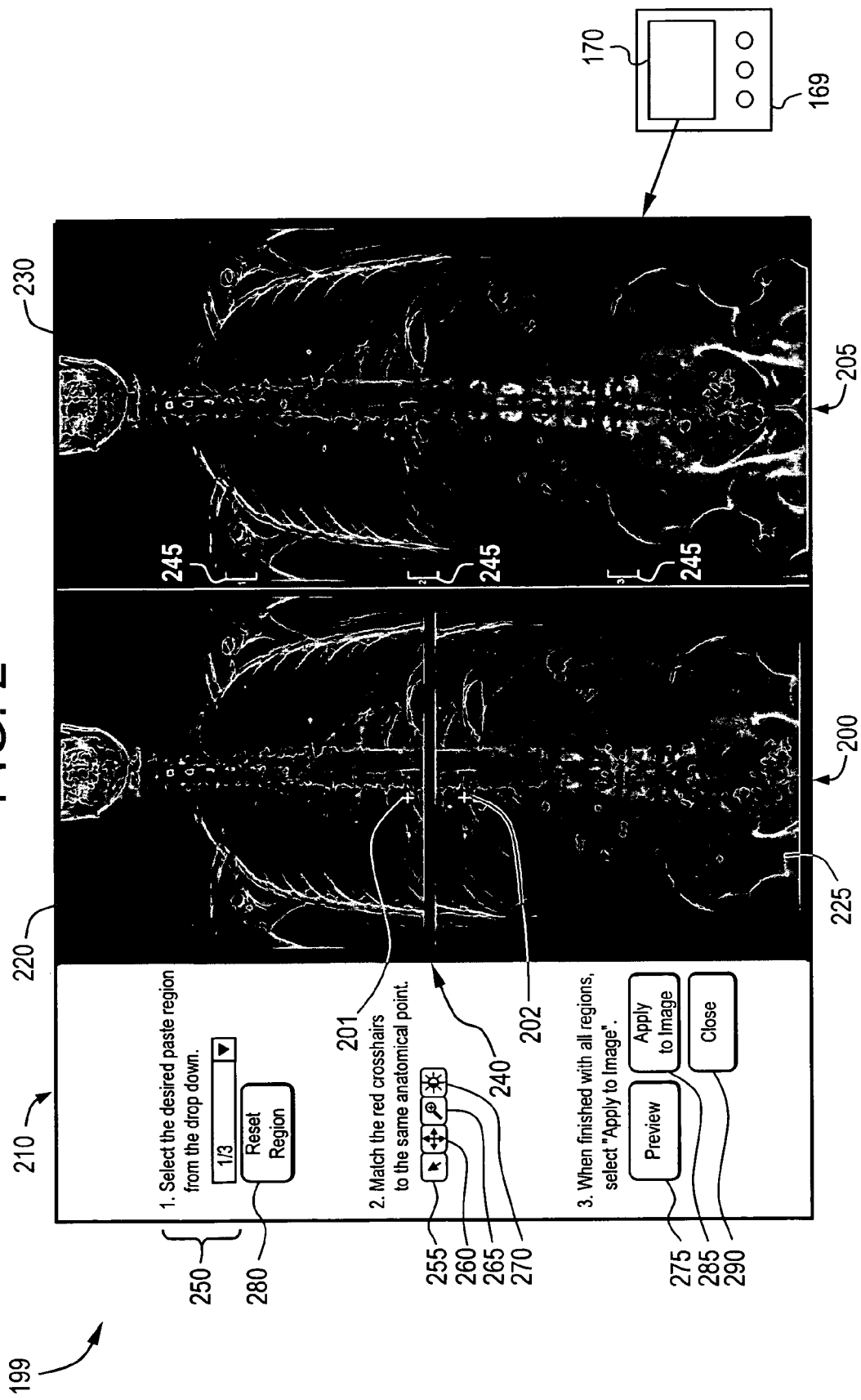
FIG. 2 depicts an exemplary embodiment of a user interface to align individual images within a stitched composite image in accordance with embodiments of the invention.

A processing device 160 communicates with the x-ray source 100, the panel detector 110, a data storage device 156, an input device 157, and an output device 169. The processing device 160 is also in communication with motors (not depicted in FIG. 1) to drive the rotation of the x-ray source 100 and the translation of the panel detector 110. The processing device 160 provides power and timing signals to the x-ray source 100 and receives the electrical signal data from the panel detector 110 for subsequent processing into a plurality of digital radiographic medical images 115. As used herein, reference numeral 115 may refer to a single image 115 or a plurality of images 115 within an imaging sequence created by the processing device 160 in response to the collection of attenuated x-ray beams 102 by the panel detector 110. The processing device 160 may transform the individual projection images 115 into a single composite image 230 (as depicted in FIG. 2), store the images 115, 230 in the data storage device 156 and display the images 115, 230 via the output device 169. In accordance with an exemplary embodiment, the images 115, 230 are viewable via a display screen 170 of the output device 169.

In response to the input of imaging parameters, such as the imaging object 105 region of interest 106 via the input device 157, the processing device 160 may determine the appropriate number of sequenced images 115 that will be required for diagnostic purposes. For each image, the x-ray source 100 and panel detector 110 will be displaced to a new position, held stationary, and an image 115 captured. In response to the rotation of the x-ray source 100 about center point 120 in the direction indicated by the arc 121, the panel detector 110 will translate downward in the direction indicated by direction arrow 131. The processing device 160 coordinates the movement of the x-ray source 100 and the panel detector 110 such that they remain in alignment, that is, such that the x-ray beam 101 is directed toward the panel detector 110.

In the exemplary schematic embodiment depicted in FIG. 1, it may be appreciated that the x-ray source 100 and the panel detector 110 are depicted in four discrete positions to capture four images 115. As depicted in FIG. 1, it may be seen that there is an overlap 116 of the images 115 captured by the panel detector 110. The overlap 116 as depicted in FIG. 1 shall provide each image 115 with redundant information, which will assist in the process (to be described further below) of stitching the individual images 115 together into the composite image 230 (depicted in FIG. 2).

Note that while each of the four positions of the panel detector 110 depicted in FIG. 1 are located on separate planes, this is for illustration purposes only. In the example of a translating panel detector 110, the panel detector 110 would remain within the same plane for each image 115 captured. While an embodiment of the invention has been described employing the rotating x-ray source 100 and translating detector 110, it will be appreciated that the scope of the invention is not so limited, and that the invention also applies to imaging systems 50 which may utilize an x-ray source 100 that is capable of translation as well as rotation, and an image detector 110 capable of additional movement, such as rotation for example.

Referring now to FIG. 2, an exemplary embodiment of a Manual Alignment User Interface (MAUI) 199, as provided by the display screen 170, is depicted. Individual images 115 are displayed in the first display panel 200. In the embodiment depicted, a first image 220 and a second image 225 from the sequence of individual images 115 are displayed within the first display panel 200. As used herein, the first image 220 and the second image 225 represent any two adjoining images 115 within the sequence of images 115 that have been selected for display in the first display panel 200. A single crosshair (also herein referred to as a point) 201, 202 is located within the overlap (also herein referred to as the stitching region) 116 of each of the adjoining images 220, 225. A second display panel 205 displays the stitched composite image 230. The stitched composite image 230 is a single image representation of at least the two images 220, 225 displayed within the first display panel 200. The stitched composite image 230 within the second display panel 205 may contain all of the individual images 115 within the sequence that has been captured by the panel detector 110, as described above. The first display panel 200 and second display panel 205 are shown together on the same display screen 170. A control panel 210 provides the capability to modify the location of the points 201, 202, and therefore the exact alignment of the first image 220 and the second image 225 within the composite image 230.

While an embodiment of the invention has been described employing a user interface having a control panel that is part of the display screen, it will be appreciated that the scope of the invention is not so limited, and that the invention also applies to a user interface wherein the control panel may be a separate input device, such as a tablet or keypad for example.

Referring briefly back to FIG. 1, the overlap 116 between the images defines what is referred to as a stitching region (also herein referred to as a seam) 240 of the composite image 230. As used herein, stitching regions 240 will refer to the region of the images 220, 225, 230 displayed in the MAUI 199 that relate to the overlap (or stitching) 116 regions depicted in FIG. 1. The stitching region 240 is proximate to the separation between the first image 220 and second image 225 in the first display panel 200. Additionally, brackets (also herein referred to as indicators) 245 displayed on the second display panel 205 indicate the location(s) of the stitching regions 240 between each pair of adjoining images 115 within the composite image 230. Located proximate to each bracket 245 will be a seam identification number, to be discussed further below. These brackets 245 are provided to call user attention to the stitching region 240 within the composite image 230. Alignment accuracy may be enhanced by careful attention to the stitching region 240, as an embodiment of the present invention provides the capability to detect and correct subtle alignment errors, as will be discussed further below.

While the embodiment described herein depicts a first display panel with two individual images, it will be appreciated that the disclosed invention is also applicable to other configurations of a first display panel, such as having one, two, three, or more individual images. Further, while the embodiment described herein depicts a second display panel with a composite image having seams indicated by brackets, it will be appreciated that the disclosed invention is also applicable to other configurations of a second display panel utilizing other methods to indicate seam locations, such as lines, arrows, stars, or other graphical or textual indicators for example. While the embodiment described herein depicts a User Interface for the management of radiographic images, it will be appreciated that the scope of the invention is not so limited, and that the invention also applies to digital medical images of alternate origin, such as Magnetic Resonance Imaging, for example.

Alignment between the first image 220 and the second image 225 is accomplished via tools provided by the control panel 210. Selection of which images 115 of the sequence of images 115 will be displayed as the first image 220 and the second image 225 is provided via a seam selection dropdown dialog 250. Referring briefly back to FIG. 1, it will be appreciated that for the example depicted, four images 115 were captured, thus creating three overlaps 116, or seams 240. Referring now to FIG. 2, the three overlaps 116 that relate to the seams 240 contained within the composite image 230 may be selected via the dropdown dialog 250. The dropdown dialog 250 provides the ability to select the specific seam 240 by the corresponding seam identification number from the complete set of seams 240 which accompany the sequence of images 115 captured. For example, if four images 115 are captured, there are a total of three seams 240. Selection of the dropdown dialog 250 (as shown) of seam 1/3 ("one of three") will cause the first and second images 115 (of a set of 4 captured images 115) to be displayed in the first display panel 200. Similarly, selection of the dropdown box of seam 2/3 ("two of three") will cause the second and third images 115 (of a set of 4 captured images 115) to be displayed in the first display panel 200. By default, the images 115 associated with the first seam 240 will be displayed within the first display panel 200 in response to the launch of the MAUI 199. Note that the above discussion, with reference to FIG. 1 and FIG. 2, describes the three brackets 245 in the second display panel 205, and the seam selection dropdown dialog 250 relating to a sequence of four images 115 with three seams 240. For illustration purposes, the two images 220, 225 displayed in the first display panel 200 relate to a sequence of two images 115 with one seam 240.

Standard image attribute manipulation tools within the control panel 210 allow for manipulation of the first image 220, second image 225, and composite image 230. A pan 260, zoom 265, and display intensity 270 tool may be used to modify the size, location, and intensity of each image 220, 225, 230 independently to best determine the appropriate alignment. It is contemplated that the area of most interest is the stitching region 240 within the individual images 220, 225 and the composite image 230. A crosshair selection button 255 allows the crosshair 201, 202 within each of the first image 220 and second image 225 to be relocated. The crosshairs 201, 202 may be located such that they are disposed upon identical locations of anatomical features contained within the redundant information of each seam 240 region of the individual images 220, 225. The standard image manipulation tools described above are provided to assist in this task, such as using the pan 260 tool and the zoom 265 tool to more accurately determine the corresponding locations of anatomical features.

Following disposition of the crosshairs 201, 202 upon identical anatomical features within the stitching region 240, selection of a preview button 275 will apply an algorithm to regenerate the composite image 230 in a manner that the first image 220 and the second image 225 will be pasted, or stitched together within the composite image 230 with an appropriate change in alignment. In response to the selection of the preview button 275, each of the images 220, 225 within the first display panel 200 will be aligned within the composite image 230 wherein the coordinates defined by each of the crosshairs 201, 202 in the stitching region(s) 240 of the individual images 220, 225 will be considered the same point within the composite image 230. Accordingly, the regeneration following the selection of the preview button 275 may cause a relative shift between the representation of the individual images 220, 225 within the composite image 230. The preview button 275 allows the composite image 230 to be regenerated within the same user interface 199 application window as the individual images 220, 225, eliminating the need to open or close additional user interface windows. Selection of the preview button 275 will not necessarily save the displayed changes to the data storage device 156 that contains the individual images 115 and the composite image 230. The algorithm to define the process of stitching may be of any image pasting application, such as that practiced within the GE DEFINIM (™) 8000, for example, available from General Electric Company. In response to appropriate radiography system 50 configuration to ensure rotational alignment of captured images 115, use of a single point 201, 202 within each image 220, 225 will enhance alignment quality. Alignment methods utilizing multiple points 201, 202 or lines within each image 220, 225 may result in the introduction of a rotational misalignment. Given that the image acquisition method minimizes rotational misalignment, the use of a single point 201, 202 within each image 220, 225 avoids the possible introduction of such rotational misalignment.

To return the crosshairs 201, 202 to their positions within the stitching 240 region of the images 220, 225 following the most recent selection of the preview button 275, a reset region button 280 may be pressed. The crosshairs 201, 202 will return to their prior positions, and additional changes from their position following the last selection of the preview button 275 will be allowed. If the preview button 275 has not been selected, the crosshairs 201, 202 will return to their original positions as shown upon the start of the MAUI 199.

Selection of an apply to image button 285 will cause the aforementioned changes to the relative position of the individual images 220, 225 within a composite image 230 to be saved to the data storage device 156. Further, the individual images 115 will be updated to indicate the new crosshair 201, 202 locations that correspond to the alignment changes, and the MAUI 199 will be exited. Selection of a close button 290 will cause the MAUI to exit without making any changes to the composite image 230 or individual images 115 stored within the data storage device 156. In an embodiment, subsequent to the selection of the close button 290, but prior to exiting the MAUI 199, a confirmation dialog box (not depicted) will appear, and give the user the choice to either continue exiting (without saving any changes), or to return to the MAUI 199, where changes may be made and saved.

Figure 3:
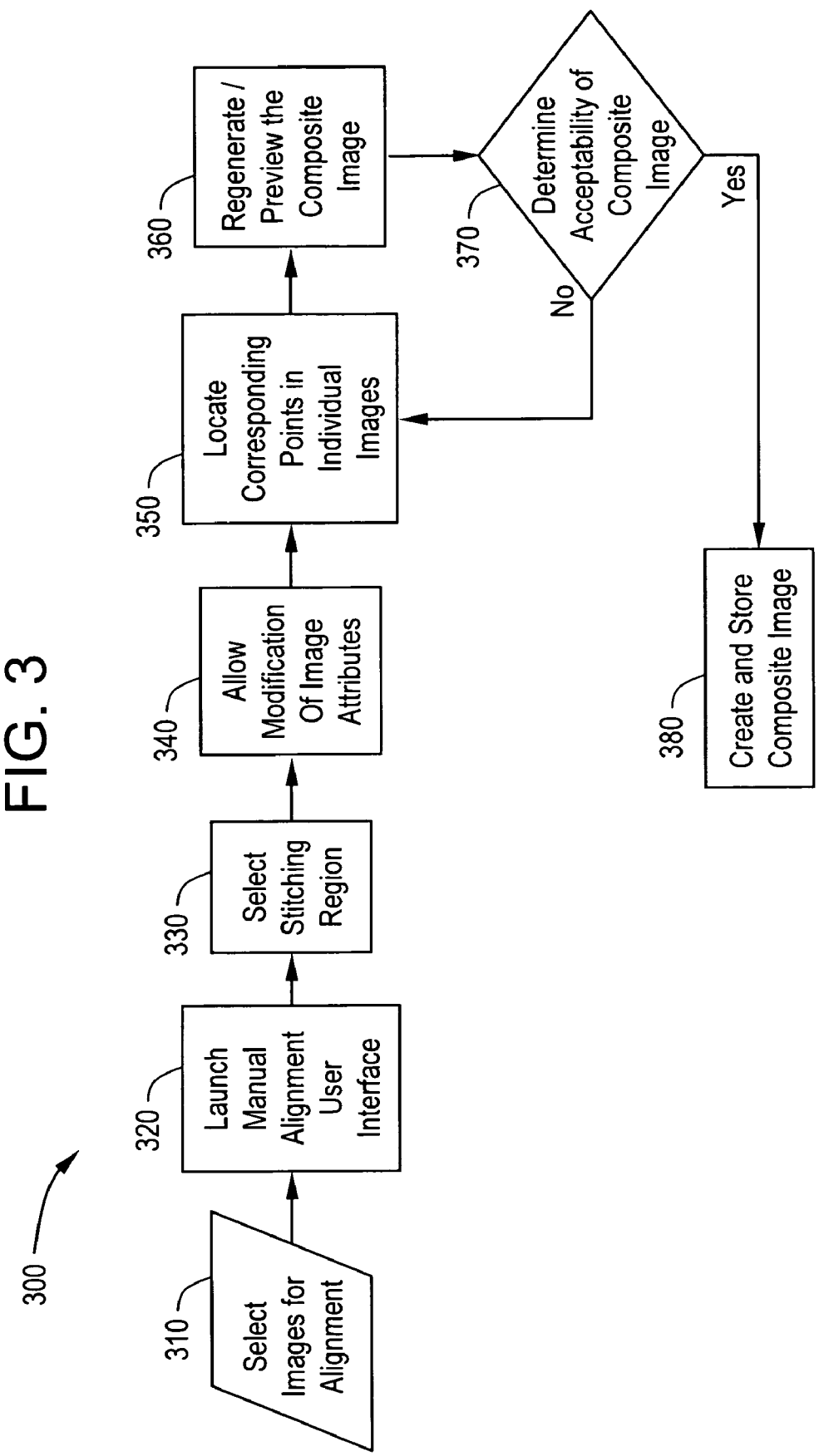
FIG. 3 depicts in flowchart form an exemplary embodiment of a method for aligning the individual images within a stitched composite image in accordance with embodiments of the invention.

Referring now to FIG. 3, a flowchart 300 depicts an exemplary workflow of an embodiment of the invention. The workflow begins via selection 310 of the images 115 for alignment. Any single image 115 within a sequence of images 115 may be selected 310. Alternatively, a composite image 230 that has been previously generated either automatically or manually may be selected 310. Following the selection 310 of an appropriate image 115, 230, the Manual Alignment User Interface (MAUI) shall be launched 320. Selection 330 of the stitching region 240 will determine which images 115 will be displayed in the first display panel 200. The system will next allow 340 modification of the image 220, 225, 230 attributes such as size, location, or intensity if necessary for improved visualization. Following any modification as allowed 340 by the system to the image attributes to enhance visualization, a single point 201, 202 shall be located 350 upon identical corresponding anatomical features or positions within the stitching region 240 of each of the individual images 220, 225. Following the location 350 of appropriate crosshair 201, 202 positions, the composite image 230 may be regenerated 360 and previewed. Subsequent to the regenerating 360 of the composite image 230, a determination 370 regarding the acceptability of the composite image 230 shall be made. If the new alignment of the regenerated composite image 230 is not acceptable, the location 350 of crosshair 201, 202 positions may be repeated until an acceptable composite image 230 is regenerated 360. In response to the determination 370 that the composite image 230 is acceptable, the new composite image 230 may be created and stored 380 in the data storage device 156 for subsequent retrieval and diagnostic review.

Figure 4:
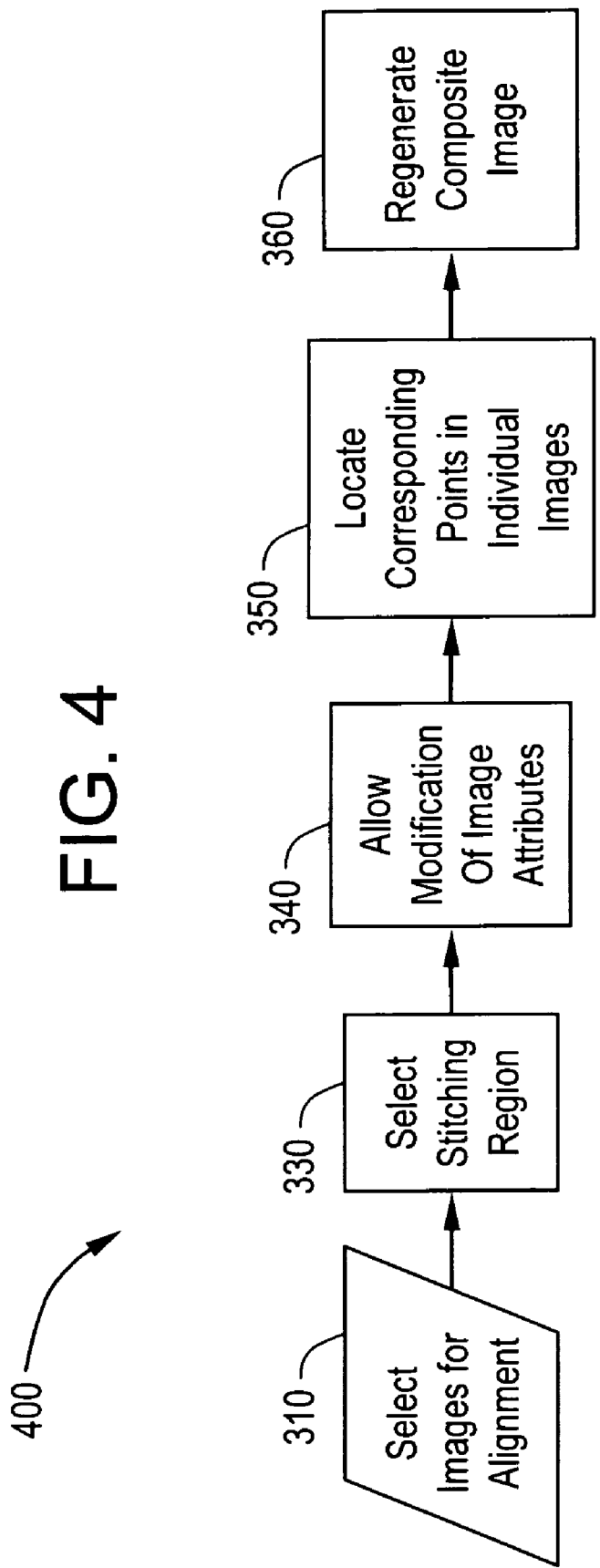
FIG. 4 depicts in flowchart form a generalized exemplary embodiment of a method for aligning the individual images within a stitched composite image in accordance with embodiments of the invention.

A more general sense of the method 300 depicted in FIG. 3 may be represented by the method 400 depicted in FIG. 4, where like elements are numbered alike.

While the embodiment described herein depicts the preferred use of a single point to mark corresponding locations with image overlap regions, it will be appreciated that the disclosed invention is also applicable to the use of other alignment methods, such as lines and more than one point, for example.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to provide an interface for alignment of a plurality of digital medical images within a single composite medical image, the single composite medical image containing the information from the plurality of medical images.

As disclosed, some embodiments of the invention may include some of the following advantages: the ability to quickly correct mis-alignment in an automatically generated composite image; the ability to create a composite image if an automatically generated composite image does not exist; the ability to enhance image quality via application of image processing to a correctly aligned composite image; the ability to enhance alignment quality by using image manipulation tools to optimize the location of corresponding points on two images; the ability to enhance alignment quality by using one alignment point within each image; and, the ability to reduce workflow via a single user interface configured to allow both modification and regeneration of composite image alignment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An interactive user interface (UI) for managing digital medical images captured via a radiographic source, comprising:
    a first display panel for displaying at least two digital medical images and a point on each of the at least two digital medical images located in associated stitching regions for stitching the at least two digital medical images together, each stitching region being proximate to a separation between the at least two digital medical images in the first display panel,
    a second display panel for displaying a composite image comprising the stitched at least two digital medical images, wherein the first and second display panels are displayed together on a same display screen;
    means for a user to select a stitching region and to modify the location of points within a selected stitching region; and
    means for applying an algorithm to regenerate the composite image in response to the modified location of the points.

2. The user interface of claim 1, wherein:
    the point on each digital medical image is a single point.

3. The user interface of claim 1, wherein:
    the second display panel displays the composite image comprising at least two of the digital medical images displayed on the first display panel.

4. The user interface of claim 3, wherein:
    the second display panel displays the composite image comprising all of the digital medical images.

5. The user interface of claim 1, further comprising:
means for a user to modify display size, location, and intensity of the at least two digital medical images and the composite image.

6. The user interface of claim 1, wherein:
the at least two digital medical images comprise radiographic images.

7. The user interface of claim 1, wherein the user interface is configured to allow:
a user to create and modify the composite image from the at least two digital medical images via alignment of the points between the at least two digital medical images to be stitched;
a user to modify a previously created composite image via realignment of the points; or
both.

8. The user interface of claim 7, wherein:
the user interface is configured to allow the composite image to be modified, regenerated, and viewed within one application window.

9. The user interface of claim 1, further comprising:
indicators in the second display panel to indicate at least a portion of the composite image that corresponds to the stitching regions of the digital medical images.

10. The user interface of claim 1, wherein:
the first display panel and the second display panel are shown together on the same display screen.

11. The user interface of claim 1, wherein the means for applying an algorithm to regenerate the composite image comprises:
automatically regenerating of the composite image in response to the modified location of the points.

12. A method for managing at least two digital medical images captured via a radiographic source, comprising:
selecting one of the at least two digital medical images displayed in a first display panel or a composite medical image comprising the at least two digital medical images in a second display panel;
selecting a seam of the composite medical image to display the at least two digital medical images in the first display panel and to display the composite image in the second display panel, the seam corresponding to a stitching region which is proximate to a separation between the at least two digital medical images;
allowing modification of display size, location, and intensity of the digital medical images in the first display panel and the composite image in the second display panel;
locating a point within each stitching region associated with the at least two digital medical images, the stitching region between each adjacent digital medical images having common image attributes;
regenerating the composite image based on the location of the corresponding points.

13. The method of claim 12, comprising:
determining the acceptability of the regenerated composite image.

14. The method of claim 12, comprising:
creating and storing an updated composite image based on the regenerated composite image.

15. The method of claim 12, wherein:
the locating a point comprises locating a single point.

16. The method of claim 12, wherein:
the selecting a stitching region, allowing modification, locating a point, and regenerating the composite image, occurs within a single user interface window, thereby eliminating the need to open or close additional user interface windows.

17. The method of claim 12, wherein:
the second display panel displays the composite image comprising the at least two digital medical images displayed on the first display panel.

18. The method of claim 17, wherein:
the second display panel displays the composite image comprising all of the digital medical images.

19. The Method of claim 12, wherein:
the selecting one of the at least two digital medical images or a composite medical image, comprises selecting radiographic medical images.

20. A non-transitory computer program product comprising a computer readable medium having computer readable program code configured for implementing the method of claim 12.

21. A computer system for managing a plurality of radiographic images, the system comprising:
a display;
an input device;
a processing circuit; and
a storage device, readable by the processing circuit, storing instructions for execution by the processing circuit for implementing the method of claim 12.

22. The method of 12, wherein regenerating the composite image comprises:
automatically regenerating the composite image based on the location of the corresponding points.

* * * * *